UNITED STATES PATENT OFFICE.

FRITZ PFLEUMER, OF DRESDEN, GERMANY.

PROCESS OF MANUFACTURING VULCANIZED FROTH.

13,667. Specification of Reissued Letters Patent. Reissued Dec. 30, 1913.

No Drawing. Original No. 1,038,950, dated September 17, 1912, Serial No. 640,648. Application for reissue filed November 12, 1913. Serial No. 800,638.

*To all whom it may concern:*

Be it known that I, FRITZ PFLEUMER, a subject of the Emperor of Austria-Hungary, residing at Dresden, Germany, have invented certain new and useful Improvements in processes of Manufacturing Vulcanized Froth, of which the following is a specification.

Processes of manufacturing elastic froth from glycerin-gelatin, india rubber or similar substances, used for elastic tire fillings or other purposes, are described in the following patents: Germany Nos. 60,230 and 92,208, Great Britain No. 22,640/07, United States Nos. 753,206 and 753,300, Germany Nos. 174,001 and 185,306, Great Britain Nos. 3314/06 and 13,390/09, France Nos. 329,117 and 402,996.

In the first-mentioned two German patents it is suggested to raise the froth or sponge-structures by mixing into the india rubber chemicals yielding gases at the vulcanizing temperature. In the next-mentioned patent it is proposed to add to the glycerin-gelatin chemicals which on coming in contact with the moist matter generate carbonic acid, and to use the thus produced gas as froth-raising medium. In the processes of the other patents mentioned above an optional gas is brought into the mass by mechanical treatment as beating, stirring, kneading, shaking or centrifuging said mass under an atmosphere of the respective gas, or by injecting the gas into the mass.

Processes of vulcanizing solid rubber articles under an atmosphere of a hot inert gas as nitrogen or carbon dioxid are described in the British Patent No. 7159/01 and United States Patent No. 661,177. In these processes it is intended to prevent air eventually included by the rubber or the vapors of the sulfur generated at the vulcanizing temperature from raising pores or bubbles by carrying out the vulcanization under pressure of said gases up to about 100 pounds per square inch or about 7 atmospheres, the gas-pressure thereby acting as mechanical counter-pressure against the raising of bubbles.

I have based my invention upon the observation that india rubber as well as guttapercha and balata are by no means homogeneous or impenetrable substances, but represent, so much as is known at present, a reticular structure just visible under the best microscopes, into which structure gas can penetrate or pass through it under certain conditions. (Literature: C. O. Weber, *The Chemistry of India Rubber*, page 19, Wroblewski's conclusions 3, 5 and 11; page 78, line 6 and 11 to 18.)

A piece of raw rubber submitted in an autoclave to a high pressure (from 80 to 300 atmospheres) of an optional gas, air nitrogen etc., on being relieved of the gas-pressure, shows a considerable increase of its bulk and a crackling, which originates from small bubbles bursting on the surface of the piece. On ceasing of the crackling the rubber piece has regained almost its original volume. The thus treated piece on superficial inspection shows a great number of pores, obviously channels worked by the gas on its way into, and out of, the rubber piece. The effect increases, if the rubber previously to its being subjected to high gas-pressure is soaked in about one quarter of its weight of any rubber solvent, for instance benzene. If, however, the rubber piece is kneaded together with from 2 to 10% of its weight of precipitated sulfur and the piece subjected under the above mentioned gas-pressures to the vulcanizing temperature, 135 to 145° C., for about two hours, the piece on being relieved of the external gas-pressure does no more allow its contents of gas to escape, and consequently expands to a highly voluminous and regular froth in the cells of which the gas is permanently imprisoned. In this case the action of the gas upon the india rubber is a directly opposite one to the action mentioned in the last cited two specifications. Such highly compressed gas acts no more as counter-pressure against any raising of bubbles, but penetrates the india rubber, filling up all the pores of the microscopic structure.

Experience teaches that india rubber in the heated state receives much more gas than it does in the cold state (*vide* C. O. Weber, Wr.'s conclusion 2), and this applies in enlarged proportions to guttapercha and balata. The heating, moreover, transfers to the material that plastic state of a tough liquid, which allows of the mass being drawn out into thin films, while vulcanization renders them sufficiently resistant to stand the stretching coincident to the expansion of the froth. In the stretched state the films are gas-tight in spite of the structure of the material. It must be considered that the natural structure of the material has the appearance of a sponge, the channels and walls of which are of smaller dimensions than the artificial froth structure forced upon the material by the described treatment.

It is not a condition of the process that the raw rubber should contain any solvent, an addition by weight of one quarter of benzene or benzol, however, allows of considerably lower gas pressures being applied for making an equally voluminous froth than are required, when every solvent is precluded. More solvent on the other hand, has a destroying effect on the material, and renders the product of vulcanization inferior.

In practice the process is carried out as follows: Ten parts, by weight, of raw rubber are kneaded together with from one-fifth to one part of precipitated sulfur; optionally according to the desired effect the rubber previously to the kneading may be soaked in about two parts of benzene or benzol. In conjunction with the sulfur antimony pentasulfid, so-called "golden sulfid" may be employed advantageously. The thus made dough is now formed into articles, the form of which is geometrically similar to the form the respective article is intended to have after transformation into froth. The proportions in sizes of the pieces formed of the rubber dough on the one side and the finished froth piece on the other naturally depend on the quantity of gas the finished froth piece is intended to contain. When vulcanized under a pressure of about 100 atmospheres the finished froth in the expanded and dry state contains about 9 parts by volume of gas in every one part of rubber, *i. e.*, about 13 parts by volume of the rubber dough must be chosen for making a froth piece of 100 parts by volume. From this the linear proportions may be derived. If the solvent is left out, in order to attain the above mentioned proportions of the volume, about 300 atmospheres gas-pressure, gaged at the vulcanizing temperature, are required. The shaping is carried out by either pressing the dough into molds, or for simple sectional pieces by squeezing the dough from a tubing machine with a mouthpiece of the required section into endless bars or rods.

The reception of gas may be considerably increased by mixing into the mass porous materials in a pulverous state, for instance Kieselguhr, ground cork, bone-black, factice, etc. In this case besides the mass each grain into its pores is receiving gas which on expansion leaves the grain forming one cell in the interior of which the grain remains. The pieces are now vulcanized in an autoclave under high pressure of a gas. Nitrogen, carbon monoxid, eventually air are suited to the purpose, while hydrogen and carbon dioxid, so-called carbonic acid, are precluded from the technical application on account of their diffusing properties as well as oxygen on account of its oxidizing action on rubber. It is of course impossible to let steam into an autoclave filled with gas under so high a pressure. The autoclave has therefore to be heated with steam from without. Also india rubber which is already vulcanized and contains no more than 10% of free sulfur, may be thus transformed into froth; it should, however, contain only small quantities of other admixtures in order to attain a froth sufficiently gas-tight for the purpose in view. A small quantity of free sulfur is always present in soft vulcanized rubber, and generally suffices to attain an additional vulcanization, which renders the froth raised stable. Thus old motor-car tubes or waste of vulcanized sheets may directly be transformed into froth sheets, and these worked up into inlayings for life-saving dresses, heels, billiard cushions, sound proof mats for typewriters and musical instruments, etc.

From the fact that vulcanized material can be transformed into froth an alteration of the described process of making froth from raw material may be derived in that direction that the raw material be vulcanized first without gas-pressure, and be placed under gas-pressure afterward. In this case, however, the material should be kept rather hot in order to carry out vulcanization and froth raising in one uninterrupted operation. This optional way has the disadvantage of the material being longer heated than in the process already described.

For many applications, as, for instance, cycle and motor-car tires the froth must contain its gas filling under a certain pressure. To subsequently compress rubber-froth that has been expanded to the atmospheric pressure in order to make froth filled with gas under pressure would be a failure, as it is a matter of experience that the films on recontraction lose their gas-tightness. Therefore the froth already after vulcanization should not be expanded down to a lower pressure than is required for its application. This pressure amounts to from 2 to 3 atmospheres (28 to 42 pounds per square inch) for cycle tires and from 4½ to 8 atmospheres (63 to 112 pounds per square inch) for motor-car tires. One of the following methods may be applied for making such froth containing gas under pressure:

1. Raw material of high tensile strength is treated in the described manner, no solvent being applied. When the vulcanization is finished the articles are left under pressure for several hours so that they may cool out and regain their original tensile strength previously to being expanded into froth.

Part of the gas in the autoclave may be let out directly after vulcanization with the purpose of starting formation of the froth structure. The gas cooling out after vulcanization its pressure further decreases.

2. Into the raw material, when being mixed with the ingredients, fibrous substances as, for instance, fibers of raw cotton, raw jute or raw hemp are kneaded. These fibers should be no longer than about $\frac{3}{16}$ of an inch (5 mm.) otherwise they would conglobate into lumps. By the quantity of fibers admixed the pressure, at which further expansion ceases, may be fixed.

By means of these methods interchangeable tire cushions are made, which upon account of their being gas elastic and indestructible by punctures represent a suitable substitute for air-tubes. They do not expand so far on being dismounted from a worn-out cover as to impede their being mounted under a new one.

Analogous to that described, the process is carried out with guttapercha and balata. These are kneaded with from 5 to 10% of precipitated sulfur, optionally with an addition of antimony pentasulfid. In the trade this chemical is to be had with an admixture of up to 50% of free sulfur, and 10% of it, containing 5% of the raw material's weight of free sulfur, give a grade of vulcanization best suited to the purpose. Also soft vulcanized guttapercha and balata may be transformed into froth in the described manner. With this process one can also manufacture froth of hard rubber, hard guttapercha and hard balata. To this end a dough containing from 30 to 50% of sulfur is used, the articles vulcanized under gas-pressure, and expanded when still hot. The vulcanization is continued on the expanded froth until the hard state is reached. The expansion must be carried out on the hot froth as otherwise it would contract on being further vulcanized. Hard vulcanized froth is used in cases, where no elastic product is required, where, however, the material shall have mechanical strength, or has to stand chemical influence as sea-water, acids or alkalis, or is subjected to higher or lower temperatures than soft vulcanized froth would stand. It can be turned, filed and bored, and numerous articles made from it, for instance, plates for temperature and high tension current insulating purposes. For many purposes it represents a suitable substitute for cork.

Having thus fully described my invention, what I claim as new and desire to secure by Letters Patent of the United States is:—

1. A process for manufacturing vulcanized froth from material such as india-rubber, gutta-percha, or balata, consisting in hot vulcanizing raw or partly vulcanized material under such a high pressure of a gas that the gas penetrates the structure of the material, and on partly or wholly releasing the external gas pressure raises the material into froth.

2. A process of manufacturing vulcanized froth from material such as india-rubber, gutta-percha or balata, consisting in hot vulcanizing raw or partly vulcanized material by keeping the thus treated material under high gas pressure, so that the gas penetrates the structure of the material until it is cooled, and afterward releasing it of the gas pressure in order to produce froth containing more than atmospheric pressure.

In testimony whereof I affix my signature in presence of two witnesses.

FRITZ PFLEUMER.

Witnesses:
B. H. Conner,
Harold B. Sharp.